US006620084B2

(12) United States Patent
Daily et al.

(10) Patent No.: US 6,620,084 B2
(45) Date of Patent: Sep. 16, 2003

(54) CONVEYOR ROLL END CAP

(75) Inventors: Alan Wells Daily, Beaver County, PA (US); John Dodsworth, Beaver County, PA (US)

(73) Assignee: Yesuvius Crucible Company, Wilmington, DE (US)

(*) Notice: Subject to any disclaimer, the term of this patent is extended or adjusted under 35 U.S.C. 154(b) by 82 days.

(21) Appl. No.: 09/970,315

(22) Filed: Oct. 3, 2001

(65) Prior Publication Data

US 2002/0065180 A1 May 30, 2002

Related U.S. Application Data

(60) Provisional application No. 60/237,968, filed on Oct. 4, 2000.

(51) Int. Cl.[7] .............................................. F16C 13/00
(52) U.S. Cl. ......................... 492/45; 492/47; 492/895.2
(58) Field of Search ................... 492/47, 45; 29/895.2, 29/525.01, 525.02, 456; 198/780, 789; 65/370.1, 374.13; 432/246, 236

(56) References Cited

U.S. PATENT DOCUMENTS

| 3,867,748 | A | * | 2/1975 | Miller ........................ 432/246 |
| 4,030,415 | A | * | 6/1977 | Fellows .................... 101/382.1 |
| 4,034,837 | A | * | 7/1977 | Vinarcsik et al. ............. 193/37 |
| 4,230,475 | A | * | 10/1980 | Dunk ........................... 65/118 |
| 4,242,782 | A | * | 1/1981 | Hanneken et al. ........... 432/246 |
| 4,397,673 | A | * | 8/1983 | Stevens .................... 65/374.11 |
| 4,399,598 | A | * | 8/1983 | Page et al. .................. 432/246 |
| 4,404,011 | A | * | 9/1983 | McMaster .................... 65/181 |
| 4,751,776 | A | | 6/1988 | Reunamaki |
| 4,864,704 | A | * | 9/1989 | Hogan et al. ................. 492/22 |
| 5,028,162 | A | * | 7/1991 | Tsuno et al. .................. 403/30 |
| 5,048,168 | A | * | 9/1991 | Vanaschen et al. ......... 432/246 |
| 5,146,675 | A | | 9/1992 | Ford et al. |
| 5,316,129 | A | | 5/1994 | Daily |
| 5,370,596 | A | | 12/1994 | Compagnon |
| 5,556,499 | A | | 9/1996 | Clough |
| 5,906,567 | A | | 5/1999 | Gautier |
| 5,944,161 | A | | 8/1999 | Sealey |

FOREIGN PATENT DOCUMENTS

| FR | 2550172 A1 | 8/1983 |
| JP | 402052983 A | * | 2/1990 |

* cited by examiner

Primary Examiner—Gregory Vidovich
Assistant Examiner—T. Nguyen
(74) Attorney, Agent, or Firm—James R. Williams

(57) ABSTRACT

The invention includes an end cap that can be securely mounted to the end of a ceramic spool. The end cap comprises a locking plate adapted to fit into a groove in the ceramic spool. A plurality of angularly offset holes in the locking plate align with similar holes in the end cap. Screws or pins are placed in the holes and welded in place to prevent backing out or loosening. In use, the locking plate is secured by the pins, the groove and the inside surface of the end cap, the combination of which inhibits misalignment. Thermal cycling does not loosen the end cap, cause eccentric rotation or crack the ceramic spool.

16 Claims, 3 Drawing Sheets

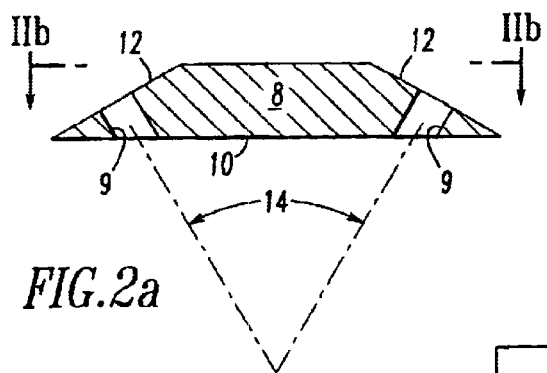
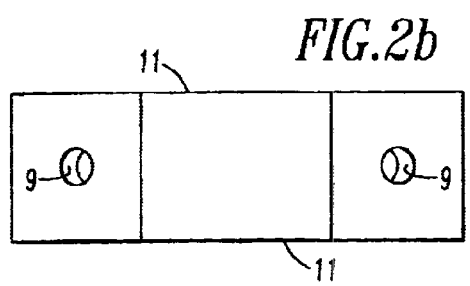
FIG.2a    FIG.2b
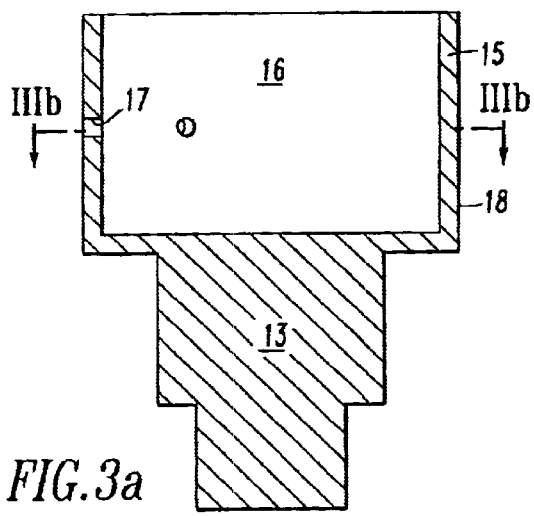
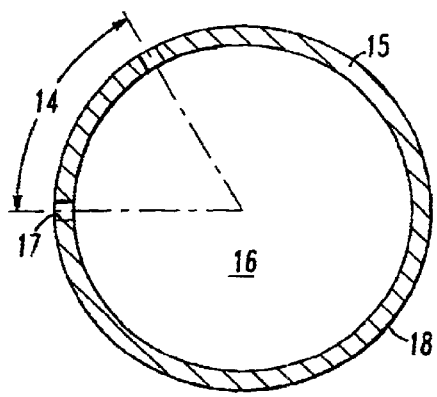
FIG.3a    FIG.3b

CONVEYOR ROLL END CAP

This Application claims the benefit of U.S. Provisional Application Ser. No. 60/237,968, filed Oct. 4, 2000, the entire disclosure of which is incorporated herein by reference.

FIELD OF THE INVENTION

The present invention relates to conveyor rolls used in high temperature applications, and more particularly concerns an improved end cap for such rolls.

DESCRIPTION OF THE RELATED ART

A conveyor roll used in high temperature applications may comprise a ceramic spool having metal end caps. Typically, the ceramic spool comprises fused silica. The end caps permit facile mounting to a bearing or drive wheel. For example, in glass tempering applications, the ceramic spool supports glass sheet, and the end caps permit mechanical coupling to the drive mechanism. The end caps should securely adhere to the spool, thereby permitting the spool to rotate at the desired speed. Eccentric rotation is generally undesirable, as this would create an uneven support surface for the glass sheet.

The different thermal expansions of the ceramic spool and the metal end caps makes securely fastening the end caps to the spool difficult and can create eccentric rotations. Various methods have been proposed to overcome this difficulty. U.S. Pat. No. 3,867,748 teaches fastening end caps to a spool using an adhesive. U.S. Pat. No. 4,242,782 proposes fastening end caps using elastic O-rings. Adhesives and O-rings can become pliable and lose holding power at elevated temperatures causing eccentric rotation of the spool and slippage between the end caps and the spool.

Metallic connectors have also been used to secure an end cap to a spool. U.S. Pat. No. 5,316,129 describes the use of a helically wound coil between the spool and the end cap. The coil includes bent portions and straight portions that permit continuous contact between the end cap and the spool despite disparate thermal expansion coefficients. U.S. Pat. Nos. 5,906,567 and 5,370,596 describe curved bimetallic shims for securing the end cap to the spool. The curvature of the bimetallic shims changes with temperature thereby retaining a secure attachment between the spool and the end cap. Assembling and repairing a coil spring or bimetallic system can, however, be difficult.

Mechanical fasteners can be used to fasten an end cap to a spool. U.S. Pat. No. 4,751,776 shows an end cap having an annular distribution of screws that thread into a ferrule on the end of a spool. The screws are tightened to secure the end cap to the spool, but thermal expansion and contraction can loosen the screws causing eccentric rotation and slippage. Screws have also been keyed to a flat surface machined on face of the spool. FR 2 550 172 describes an end cap including a metallic collar between the spool and the end cap. The end cap is locked in place with a key fitted to a flat surface of the spool. The collar has a thermal expansion greater than the end cap, and is intended to compensate for the difference in thermal expansion between the end cap and the spool. In practice, the collar does not expand sufficiently and loosening of the end cap results. U.S. Pat. No. 5,146,675 discloses a screw that can be tightened to force a metal plate against a flat on the spool, which presses the spool against the inner surface of the end cap. The end cap includes an access opening that permits the screw, metal plate and end cap to be welded together, thereby preventing the screw from backing out. Effectively, the end cap and the spool connect across a single axis, that is, the screw. Thermal cycling across a single axis of contact can cause eccentric rotation and movement of the metal plate relative to the spool. Such movement can even cause the plate to contact the edge of the flat and crack the spool.

A need persists for an end cap that fixedly and centrally secures to a ceramic spool and is resistant to loosening after repeated thermal cycling. The end cap should also be easy to install and repair.

SUMMARY OF THE INVENTION

The objective of the present invention is to provide an end cap that fixedly attaches to a ceramic spool despite repeated thermal cycling. The cap includes a locking plate adapted to fit into tight connection with a groove in the spool by tightening of at least two pins, which fix the locking plate in place and prevent wobble. The pins are then prevented from loosening by welding in place.

One aspect of the invention shows an end cap comprising a ferrule and a locking plate. The locking plate is adapted to fit into a mated groove in the spool, and the ferrule is placed over the end of the spool. At least two pins extend through the ferrule and fix the locking plate in place. The pins may be screws or other similar mechanical fasteners. The pins are then welded to the end cap to prevent loosening.

A further aspect of the invention describes the pins as radially offset by about 15°–90° and preferably around 60°. The offset creates two axes securing the locking plate and reducing its wobble, thereby reducing loosening and eccentric rotation of the spool.

Preferably, the pins are at or below the outer surface of the end cap. This permits the holes and the pins to be welded closed, which promotes a more aesthetic appearance, prevents build-up in the holes and loosening of the pins. Welding of the pins to the end cap is preferably accomplished using heat, but can also be effected by chemical action, such as with a high temperature adhesive.

In one embodiment, the end cap is tapped to receive the screws and the locking plate has two open holes for accepting the screws. Tightening the screws will drive the screws through the open holes. The screws, groove and ferrule fix the locking plate in place and secure the end cap to the spool.

In a second embodiment, screws driven into blind untapped holes in the locking plate press the spool against the inside surface of the end cap and frictionally improve the contact between the end cap and the spool. Alternatively, holes in the locking plate are tapped and holes in the ferrule are untapped. In either situation, the end cap is securely and frictionally mounted to the spool.

In another embodiment, a supplemental means of fixing the end cap to the spool is provided. Conveniently, an adhesive may be used, such as a room temperature vulcanizing (RTV) silicone, between the end cap and the spool.

BRIEF DESCRIPTION OF THE DRAWINGS

FIG. 2*a* is a cross-section of a locking plate.

FIG. 2*b* is a top view of a locking plate.

FIG. 3*a* is an axial cross-section of an end cap.

FIG. 3*b* is a lateral cross-section of an end cap showing the angle of offset.

DETAILED DESCRIPTION OF THE PREFERRED EMBODIMENTS

Figure 1A:
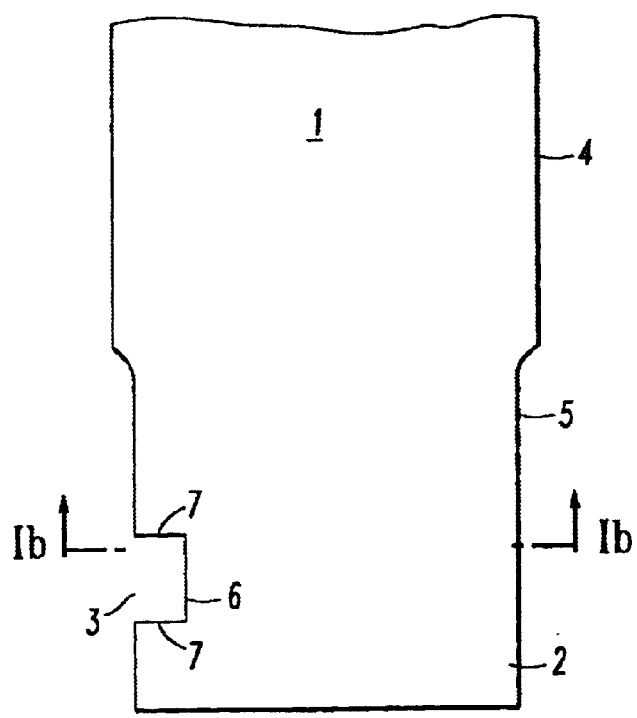
FIG. 1*a* is an axial cross-section of a spool depicting a groove.
Figure 1B:
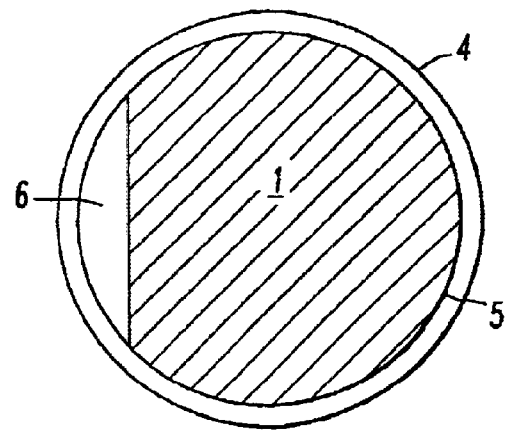
FIG. 1*b* is a lateral section of a spool showing the flat within the groove.

FIGS. 1a and 1b show one end of a refractory ceramic spool 1 as used in a conveyor roller. The spool will frequently have an end surface 5 of reduced diameter over which an end cap (not shown) can be secured. The present invention includes a spool 1 having an end 2 with a groove 3. The groove 3 comprises a flattened portion having a bottom 6 and preferable will also include a plurality of edges 7. The bottom and edges may be of any shape. Conveniently, the groove is formed by a grinding wheel, resulting in an arched bottom and two, parallel edges perpendicular to the bottom. Preferably, the bottom 6 is substantially flat.

A locking plate 8, as shown in FIGS. 2a and 2b, is adapted to fit into the groove 3. The locking plate 8 should be formed from a material that is strong at elevated temperatures and resistant to brittle failure. Metals, particularly mild steel, are suitable; although, other materials could also be used. The locking plate comprises a contact surface 10 adapted to align with the bottom 6 of the groove 3. The sides 11 of the locking plate 8 should align with the edges 7 of the groove 3. Although generally rectangular shapes are easily produced, the locking plate 8 and groove 3 can any number of shapes, including crescent-shaped and shapes with non-parallel sides. The locking plate 8 includes at least two internal holes 9 inclined at an offset angle 14 from each other. The offset angle should be about 15°–90° and preferably around 60°. The internal holes 9 are adapted to receive pins for securing the locking plate 8. The internal holes 9 may be tapped or untapped, and may extend through the locking plate 8 (as shown) or terminate within the locking plate 8.

An end cap 13 of the present invention, as shown in FIGS. 3a and 3b, includes a ferrule 15 that forms a cup 16 adapted to receive the end 2 of the spool 1. At least two external holes 17 extend through the ferrule 15 and are adapted to couple with the internal holes 9 in the locking plate 8. The external holes 17 are also positioned at a complimentary offset angle 14 to the offset angle of the internal holes 9 in the locking plate 8, and are conveniently countersunk to permit pins to remain below the outer surface 18 of the ferrule 15. Conveniently, the pin comprises a threaded section to speed installation. Either the external holes 17 or internal holes 9 may be tapped. Tapping of the external holes 17 permits easier installation of the end cap 13 onto the spool 1.

Figure 4:
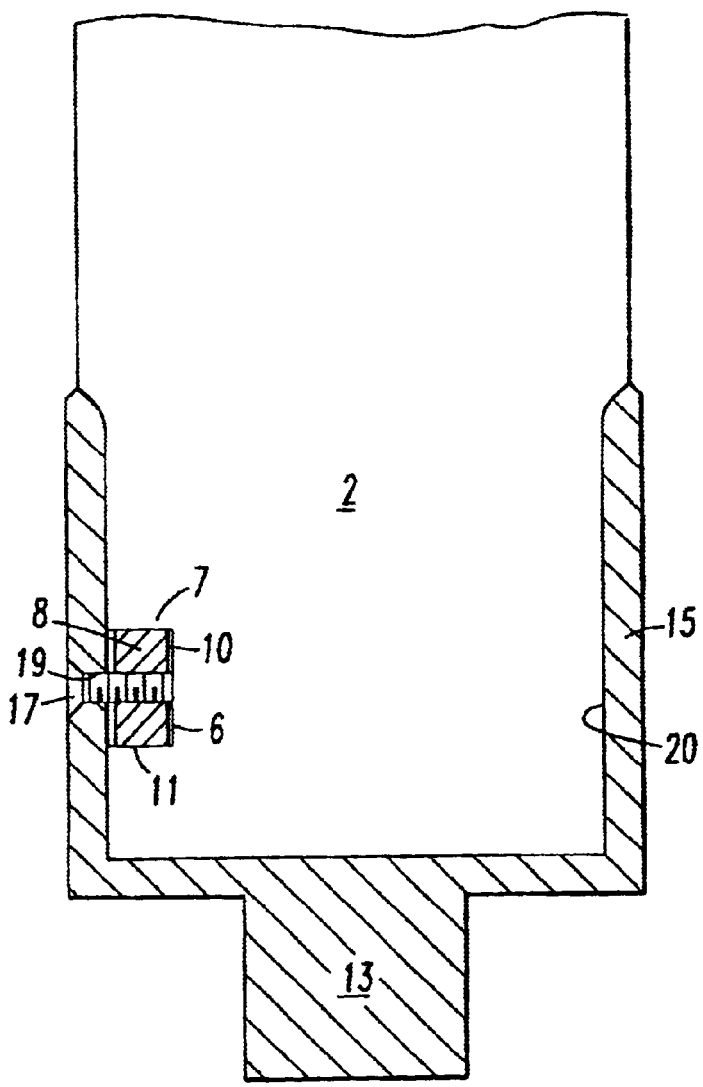
FIG. 4 is an axial cross-section of an end cap on a spool.

An end cap 13 secured to the end 2 of the spool 1 is shown in FIG. 4. The locking plate 8 is placed inside the groove 3 so that its contact surface 10 rests on the bottom 6, and its sides 11 align with the edges 7 of the groove 3. The end cap 13 is fitted over the end 2 of the spool 1. Sloped faces 12 on the locking plate 8 permit a ferrule 15 of the end cap 13 to fit around the locking plate 8. Pins 19 extend through the ferrule 15 and into the locking plate 8. In one embodiment, the pins pass substantially through the locking plate 8. The edges 7 and bottom 6 of the groove 3, the inside surface 20 of the ferrule 15, and the pins 19 cooperate to fix the locking plate 8 and secure and centrally align the end cap 13 onto the spool 1. The combination of the locking plate 8 and pins 19 are capable of transmitting sufficient torque to rotate the spool 1. Pins 19 passing through the ferrule 15 and substantially or completely through the internal holes 9 of the locking plate 8 will often provide sufficient torque.

Pins 19 can be welded in place by heat or chemical methods well known to one skilled in the art. Conveniently, welding is spot welding. Welding inhibits loosening or backing out of the pins after repeated thermal cycling. The external holes 17 may be filled with weld or an equivalent. This promotes a more aesthetic appearance, prevents build-up in the holes and loosening of the pins.

Importantly, the pins 19 are positioned at an offset angle 14.through the ferrule 15 and into the locking plate 8, thereby pinning the locking plate 8 in place through at least two axes. Prior art permitted locking plates to rotate about a single axis, which allowed the plate to misalign and potentially fracture the spool after repeated thermal cycling.

Optionally, an adhesive can be used to improve the joining of the end cap 13 to the spool 1. Such adhesives are well known to one skilled in the art and include room temperature vulcanizing silicones and other high temperature adhesives. Obviously, the adhesive can transmit torque for rotating the roller and can reduce the torque stress on the locking plate 8 and pin 19 combination.

Joining can also be enhanced by creating a locking plate 8 having blind internal holes 9. Tightening a screw 19 in a threaded external hole 17 would force the end 2 of the spool 1 against the inside surface 20 of the ferrule 15, thereby increasing pressure of the end cap 13 against the spool. Alternatively, a combination of screws and threaded holes could be used to force the locking plate 8 against the inside surface 20 of the ferrule 15. The frictional contact created would supplementally secure the end cap to the spool.

Obviously, numerous modifications and variations of the present invention are possible. It is, therefore, to be understood that within the scope of the following claims, the invention may be practiced otherwise than as specifically described.

We claim:

1. An end cap for a ceramic spool comprising:
   a) a metal ferrule adapted to fit over an end of the ceramic spool and having a longitudinal axis;
   b) a locking plate adapted to mate with a groove in the ceramic spool; and
   c) a plurality of pins radially offset around the longitudinal axis, fixedly secured in and extending from the ferrule to the locking plate, and capable of forcing the locking plate against the groove when the end cap is on the ceramic spool.

2. The end cap of claim 1, wherein the locking plate is crescent-shaped.

3. The end cap of claim 1, wherein at least one weld secures each pin to the ferrule.

4. The end cap of claim 3, wherein the weld comprises a type selected from the group consisting of chemical and thermal welds.

5. The end cap of claim 1, wherein the pins are radially offset around the longitudinal axis at an angle from about 15°–90°.

6. The end cap of claim 1, wherein the end caps includes an outer surface and the pins are at or below the outer surface of the end cap.

7. The end cap of claim 1, wherein the pins comprise screws.

8. The end cap of claim 6, wherein the wall of the ferrule includes tapped holes to receive the screws and the locking plate includes blind holes for receiving the screws.

9. The end cap of claim 6, wherein the wall of the ferrule includes untapped holes and the locking plate includes tapped holes for receiving the screws.

10. The end cap of claim 1, wherein a supplemental mechanism fixes the end cap to the spool.

11. The end cap of claim 9, wherein the supplemental mechanism comprises a room temperature vulcanizing silicone between the end cap and the spool.

12. An end cap for a ceramic spool comprising:
 a) a metal ferrule adapted to fit over an end of the ceramic spool, the ferrule comprising a plurality of tapped holes through a wall of the ferrule and having a longitudinal axis;
 b) a locking plate comprising a plurality of blind untapped holes and adapted to mate with a groove in the ceramic spool; and
 c) a plurality of screws radially offset around the longitudinal axis, threaded through the tapped holes, and cooperating with the blind untapped holes, whereby tightening the screws is capable of forcing the locking plate against the groove when the end cap is on the ceramic spool.

13. An end cap fixedly secured to an end of a ceramic spool and comprising:
 a) a metal ferrule having a longitudinal axis;
 b) a locking plate mating with a groove defined by the end; and
 c) a plurality of pins radially offset around the longitudinal axis, fixedly secured in a wall of the ferrule and extending from the ferrule to the locking plate, and forcing the locking plate against the groove.

14. The end cap of claim 13, wherein the pins comprise screws welded to the ferrule.

15. The end cap of claim 13, wherein the groove is a flattened portion.

16. An end cap fixedly secured to at least one end of a ceramic spool where the end includes a flattened portion, the end cap comprising:
 a) a metal ferrule having a longitudinal axis and a plurality of tapped holes radially offset around the longitudinal axis at an angle from about 15°–90°;
 b) a locking plate mating with the flattened portion of the end and comprising blind holes;
 c) a plurality of screws threaded through the tapped holes and terminating in the blind holes, the screws forcing the locking plate against the flattened portion; and
 d) a plurality of welds fixedly securing the screws.

* * * * *